US012089762B1

(12) United States Patent
Overton

(10) Patent No.: US 12,089,762 B1
(45) Date of Patent: Sep. 17, 2024

(54) ADAPTABLE DECORATION AND MULTI-OCCASION LIGHTING SYSTEM

(71) Applicant: Corey David Overton, Atlanta, GA (US)

(72) Inventor: Corey David Overton, Atlanta, GA (US)

(*) Notice: Subject to any disclaimer, the term of this patent is extended or adjusted under 35 U.S.C. 154(b) by 0 days.

(21) Appl. No.: 18/627,995

(22) Filed: Apr. 5, 2024

Related U.S. Application Data

(60) Provisional application No. 63/494,289, filed on Apr. 5, 2023.

(51) Int. Cl.

| | |
|---|---|
| ***A47G 33/08*** | (2006.01) |
| ***A47G 33/06*** | (2006.01) |
| ***F21S 4/28*** | (2016.01) |
| ***F21V 21/14*** | (2006.01) |
| ***F21W 121/04*** | (2006.01) |
| ***F21Y 107/70*** | (2016.01) |
| ***F21Y 113/00*** | (2016.01) |

(52) U.S. Cl.
CPC ............. *A47G 33/08* (2013.01); *A47G 33/06* (2013.01); *F21S 4/28* (2016.01); *F21V 21/14* (2013.01); *A47G 2033/0827* (2013.01); *F21W 2121/04* (2013.01); *F21Y 2107/70* (2016.08); *F21Y 2113/00* (2013.01)

(58) Field of Classification Search
CPC ....... A47G 33/06–08; A47G 2033/0827; F21S 4/20–28; F21V 21/14; F21V 21/26–30; F21W 2121/04; F21Y 2107/70; F21Y 2113/00–17
See application file for complete search history.

(56) References Cited

U.S. PATENT DOCUMENTS

| | | | |
|---|---|---|---|
| 5,639,157 | A | 6/1997 | Yeh |
| 6,070,991 | A | 6/2000 | Rumpel |
| 6,132,063 | A | 10/2000 | Byers |
| 6,155,697 | A | 12/2000 | Ahroni |
| 6,340,238 | B1 | 1/2002 | Pan |
| 6,478,455 | B2 | 11/2002 | Ahroni |
| 6,773,134 | B2 | 8/2004 | Harvey |
| 7,018,066 | B2 | 3/2006 | Kirven |
| 8,087,796 | B2 | 1/2012 | Golembiowski |
| 8,240,883 | B2 | 8/2012 | Barbieri |
| 8,485,690 | B1 | 7/2013 | Garcia et al. |
| 8,491,147 | B1 | 7/2013 | Bardash, Jr. |

(Continued)

*Primary Examiner* — Jason M Han
(74) *Attorney, Agent, or Firm* — Dunlap Bennett & Ludwig, PLLC

(57) ABSTRACT

An adaptable decoration and lighting system is provided enabling a method of transforming a systemic device, through moving it between a retracted condition and a plurality of extended conditions, to mimic different holiday icons. The systemic device has a shaft and a plurality of support ribs pivotally coupled thereto to move between the different conditions, whereby the plurality of support ribs move between a parallel relationship with the shaft to radial relationship as it moves between the retracted condition and the plurality of extended conditions. A locking mechanism slidably coupled to the shaft can lock the plurality of support ribs in each condition of the retracted condition and the plurality of extended conditions. Light strings are concentrically attached to the plurality of support ribs along with a decorative accessory or two enable a method of selectively effectuating one of a multiple holiday-inspired configurations of the system.

10 Claims, 5 Drawing Sheets

(56) References Cited

U.S. PATENT DOCUMENTS

| | | | |
|---|---|---|---|
| 11,168,851 | B1 | 11/2021 | Chen |
| 2018/0209596 | A1 | 7/2018 | Tsai |
| 2020/0128994 | A1 | 4/2020 | Ford |

ADAPTABLE DECORATION AND MULTI-OCCASION LIGHTING SYSTEM

CROSS-REFERENCE TO RELATED APPLICATION

This application claims the benefit of priority of U.S. provisional application No. 63/494,289, filed 5 Apr. 2023, the contents of which are herein incorporated by reference.

BACKGROUND OF THE INVENTION

The present invention relates to lighting systems and, more particularly, to decorations and lighting systems that may be used for multiple purposes on multiple occasions.

Holiday decorating is a longstanding tradition that allows people to express their holiday spirit in unique and creative ways. Each holiday is associated with its own unique themes and imagery, and people often celebrate by displaying different decorations for each holiday. However, putting up and taking down holiday decorations takes significant amounts of time and effort that many people do not have. Further, when each holiday requires different decorations, people need to set aside storage space for the holiday decorations when the holiday decorations are not in use. This can lead to issues of lack of space in homes and lead to people renting storage space or else living with clutter.

As can be seen, there is a need for an adaptable decoration and lighting system capable of being used as decorations for multiple holiday occasions.

SUMMARY OF THE INVENTION

The present invention provides an adaptable decoration and lighting system that is capable of being used on multiple holiday occasions. Thus, people only need to set up the decoration and lighting system once and do not have to take it down between holidays. Further, the present invention saves space for people by eliminating the need for people to have multiple sets of holiday decorations.

In one aspect of the present invention, a decoration and lighting system includes the following: a shaft; a plurality of support ribs pivotally coupled to the shaft at a distal end thereof so that the plurality of support ribs is simultaneously movable between a retracted condition and a plurality of extended conditions; a locking mechanism slidably connected along the shaft in such a way as to enable the movability between the retracted condition and the plurality of extended conditions as well as lock the plurality of support ribs in each of the plurality of extended conditions; and a plurality of light strings connected to the plurality of support ribs so as to have a spaced apart concentric relationship relative to each other.

In another aspect of the present invention, the decoration and lighting system includes the following: a decoration accessory removably attachable to the shaft or one support rib of the plurality of support ribs, wherein the shaft has a shaft length, and each of the plurality of support ribs have a rib length so that in one of the plurality of extended conditions a distal end of each of the plurality of support ribs and a proximal end of the shaft share a prop elevation, wherein each of the plurality of light strings connects to the plurality of support ribs; further providing a plurality of stretching ribs pivotally coupled to and circumferentially spaced apart along the locking mechanism so that each of the plurality of stretching ribs, at a distal end, is pivotably coupled to a midportion of an operatively associated support rib of the plurality of support ribs, wherein slidable movement of the locking mechanism along the shaft urges, by way of the plurality of stretching ribs, the plurality of support ribs to move between the retracted condition and the plurality of extended conditions; further providing a canopy that envelops an inward surface and an outward surface of the plurality of support ribs, wherein the plurality of support ribs is locked in a tree configuration, supported along the prop elevation by a supporting surface, and the decorative accessory is a star connectable to the distal end of the shaft, or wherein the device is locked in the most extend condition, with the plurality of support ribs radially extending from the distal end of the shaft and the decorative accessory is a spider connectable to one of the plurality of support ribs.

In yet another aspect of the present invention, a method of decoratively lighting for a plurality of holidays includes the following: in early October, locking the above-mentioned decoration and lighting system at a fully extended condition, wherein the decorative accessory is a spider; in early December, moving said decoration and lighting system to a tree extended condition so that the plurality of support ribs define an approximate thirty-degree angle with the shaft; locking said decoration and lighting system in the tree extended condition; propping said decoration and lighting system along a substantially level supporting surface by way of a proximal end of the shaft and distal ends of the plurality of support ribs; and replacing the spider with a star decorative accessory, wherein the star decorative accessory is removably connected to the distal end of the shaft.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
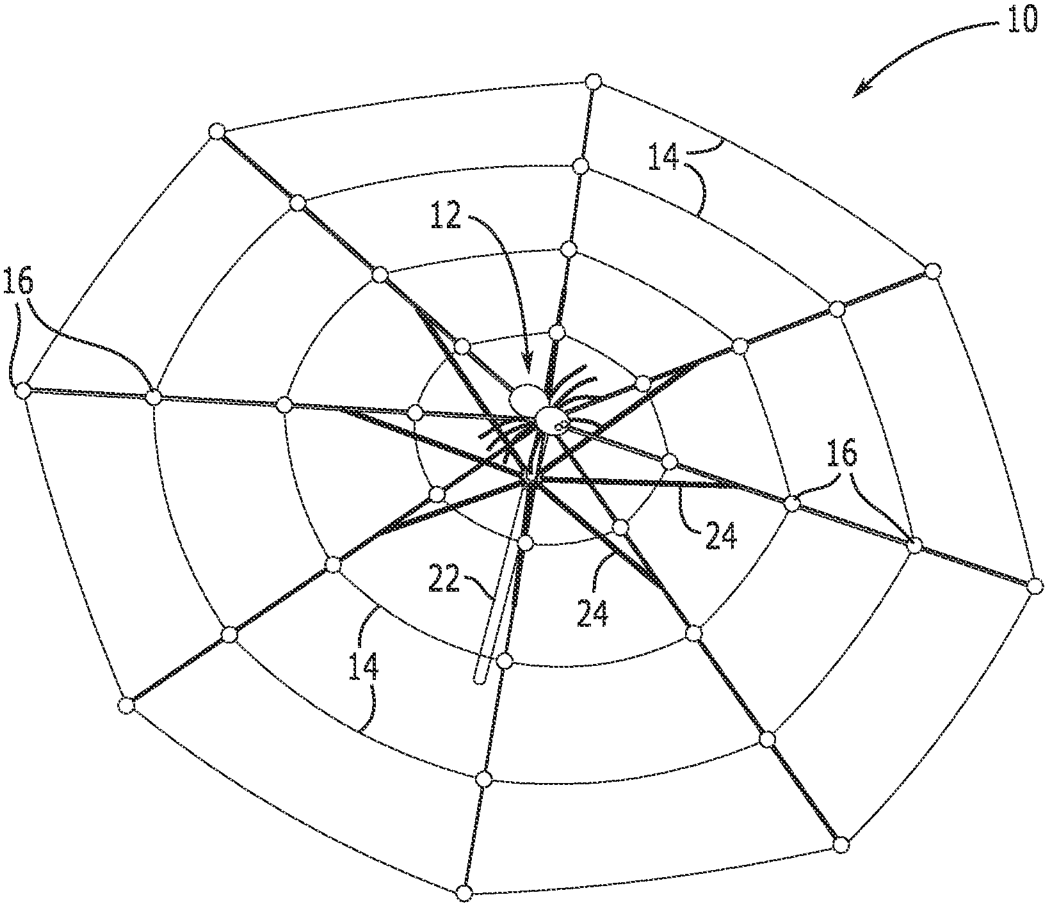
FIG. 1 is a front perspective view of an exemplary embodiment of the present invention shown in use in an extended condition.
Figure 2:
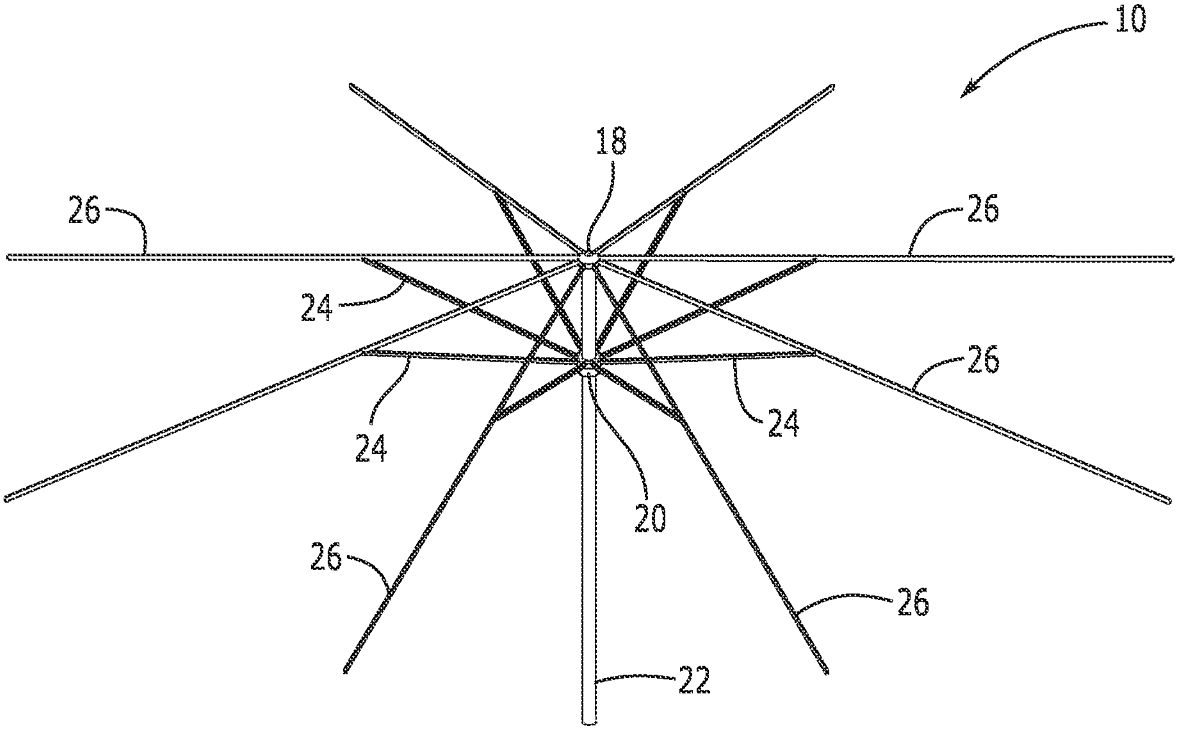
FIG. 2 is a side perspective view of an exemplary embodiment of the present invention.

Referring to FIG. 2, an embodiment of the present invention provides an adaptable decoration and lighting system 10 comprising a frame and a plurality of string light segments. The frame comprises a shaft providing a plurality of support ribs 26 pivotally coupled to the shaft 22 at a distal end 18 thereof so that the plurality of support ribs 26 is simultaneously movable between a retracted condition and an extended condition. In the extended condition the plurality of support ribs extend radially from the distal end 18 of the shaft 22 in a radially spaced apart arrangement. A locking mechanism 20 encircles the shaft and is slidably engaged with the shaft so as to enable the movability between the retracted condition and the extended condition as well as lock the plurality of support ribs in the extended condition. A plurality of stretching ribs 24 is pivotally coupled to and circumferentially spaced apart along the locking mechanism 20. For each stretching rib 24 a proximal end is pivotably coupled to the locking mechanism 20 while a distal end of the stretching rib is pivotably coupled to a midportion of an operatively associated support rib 26 of the plurality of support ribs 26, whereby slidable movement of the locking mechanism 20 along the shaft urges operatively associated support rib to move between the retracted condition and the extended condition. The locking mechanism 20 and plurality of stretching ribs 24 cooperate such that the locking mechanism 20 slides along the shaft 22, the position of each of the plurality of support ribs 26 relative to the shaft 22 changes.

Referring to FIG. 2, an embodiment of the present invention provides a plurality of string light segments comprises a plurality of light elements 16 electrically coupled to insulated electrical wiring 14. Each light string of the plurality of light strings is attached to the plurality of support ribs 26 at approximate distance from the distal end 18 of the shaft 22 so that the plurality of light strings forms a spaced-apart concentric arrangement along the plurality of support ribs 26. In other words, in one embodiment, a first group of the plurality of string light segments extends along each of the plurality of support ribs. A second group of the plurality of string light segments extends between at least two adjacent support ribs of the plurality of support ribs. The second group of the plurality of string light segments may further be attached to each of the plurality of support ribs such that the second group of the plurality of light string segments encircle the shaft.

Figure 5:
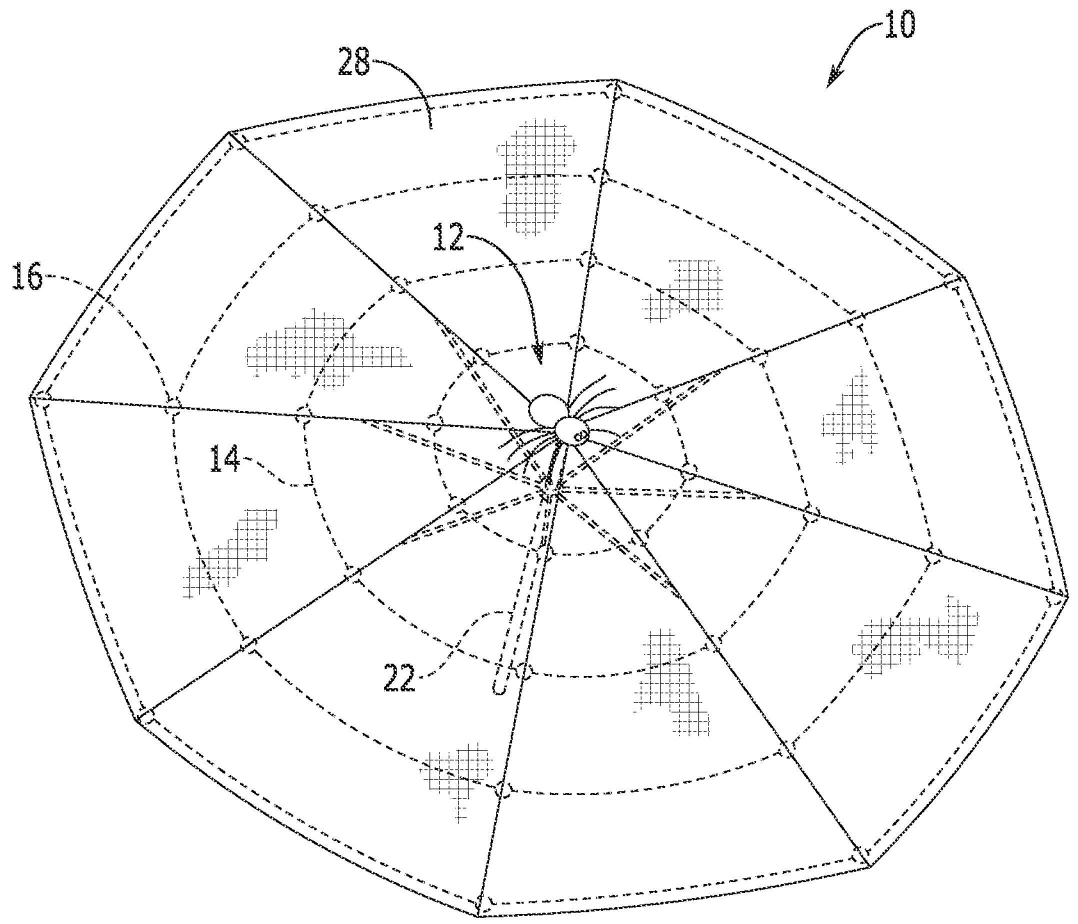
FIG. 5 is a perspective view of an exemplary embodiment of the present invention shown with a canopy installed.

Referring to FIG. 5, an embodiment of the present invention provides decorative accessories 12 may also be releasably attached to the shaft 22, support ribs 26, or plurality of light string segments. The adaptable decoration and lighting system 10 may further comprise a canopy 28 that extends between each of the plurality of support ribs such that the canopy 28 envelopes the shaft when the plurality of support ribs are brought into a position adjacent the shaft.

Figure 3:
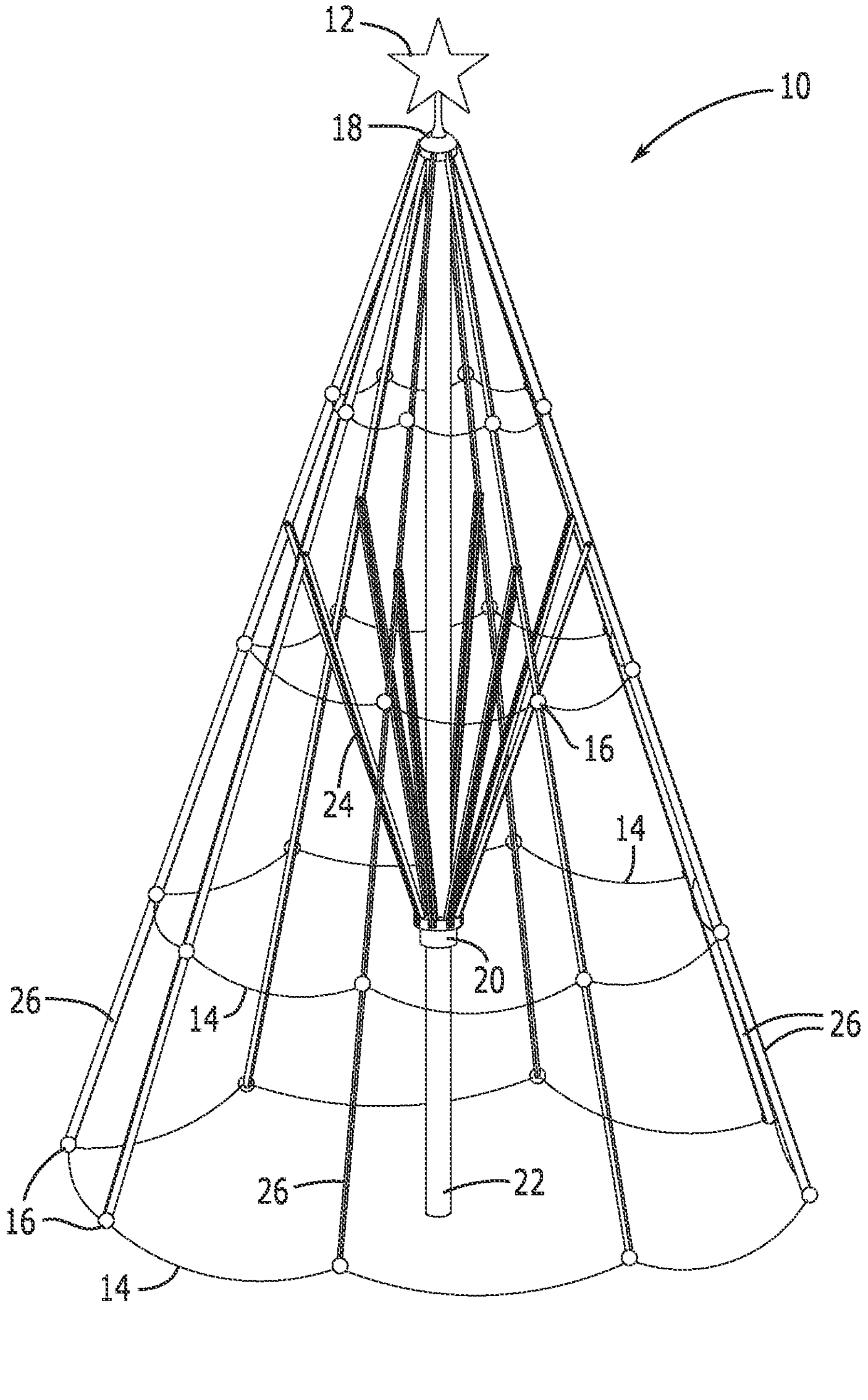
FIG. 3 is a perspective view of an exemplary embodiment of the present invention shown in use in a partial extended condition.
Figure 4:
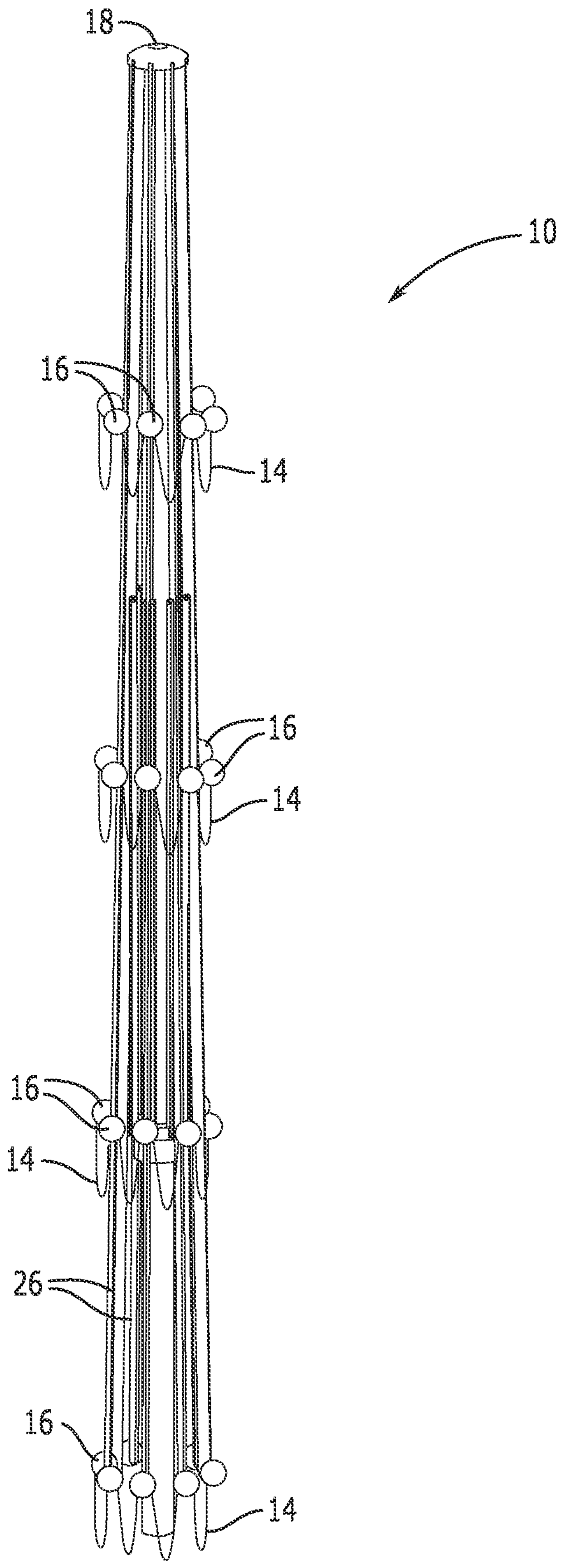
FIG. 4 is a perspective view of an exemplary embodiment of the present invention shown in a collapsed or retracted condition.

In operation, the adaptable decoration and lighting system 10 may be placed into a closed position/retracted condition, a fully open position, extended condition, and a partially closed position. In the closed position, the slidable lock mechanism 20 is lowered along the shaft 22 away from the first shaft end such that the plurality of support ribs 26, plurality of stretching ribs 24, and plurality of string lights segments are collapsed into a position adjacent the shaft 22. In the fully open position, the slidable lock 20 is moved along the shaft towards the distal end 18 such that the plurality of stretching ribs 24 cause the plurality of support ribs 26 to extend substantially perpendicular to the shaft 22, with a second end of the each of the plurality of support ribs 26 being distal from the shaft 22. In the partially closed position, the slidable lock 20 may be moved to a desired position along the shaft such that the plurality of support ribs 26 lie at one selected acute angle (of a plurality of possible acute angles, between zero and ninety degrees) relative to the shaft 22, as shown in FIG. 3, and then locked in that orientation by way of the lock 20. It being understood that in the retracted condition, the plurality of support ribs 26 lie at an approximate parallel orientation relative to the shaft 22 (near zero-degree angle relative to the shaft 22).

The plurality of support ribs 26 have a length such that in the partially closed/extended condition, the distal ends of the plurality of support ribs 26 and the proximal end of the shaft 22 lie along a shared plane, as illustrated in FIG. 3, so that said support rib distal ends and the shaft proximal end can be propped along a level supporting surface in a ‘ tree configuration’ evocative of a Christmas tree, whereby the light strings replicated Christmas tree lights or ornaments, and wherein a decorative accessory 12 shaped like a star crowns the ‘tree configuration.

It should be noted that the materials comprising the adaptable decoration and lighting system are not particularly limited. For example, the shaft, plurality of support ribs, and plurality of stretching ribs may be formed of metals, hard plastics, or other similarly lightweight and strong materials. Further, the plurality of light bulbs may comprise incandescent bulbs, light emitting diode (LED) bulbs, or other similar light emitting components.

Referring now to FIGS. 1 through 5, an adaptable decoration and lighting system according to an embodiment of the present invention is shown. The adaptable decoration and lighting system comprises a frame and a plurality of string light segments. The frame comprises a shaft and a plurality of support ribs pivotally coupled to the shaft. A locking mechanism encircles the shaft and is slidably engaged with the shaft. A plurality of stretching ribs is pivotally coupled to the locking mechanism. Further, each of the plurality of stretching ribs is pivotally secured to a corresponding one of the plurality of support ribs. The locking mechanism and plurality of stretching ribs cooperate to adjust the position of each of the plurality of support ribs relative to the shaft.

A plurality of string light segments is attached to each of the plurality of support ribs. The plurality of string light segments may be arranged such that in a fully open position/extended condition the lighting system mimics the appearance of a spider web, with (FIG. 5) and without (FIG. 1) the canopy 28, especially if the decorative accessory 12 resembles a spider, thereby providing an ideal display for Halloween.

Further the plurality of string lights is arranged such that in the partially closed position, the adaptable decoration and lighting system mimics the appearance of a tree, for example a Christmas tree. Accessories, such as a miniature spider or tree topper, may be releasably attached to the shaft, support ribs, or plurality of light string segments.

The present invention thus provides an easily collapsible and easily adaptable decoration and lighting system that may be used as holiday decoration and lighting for multiple holidays. People are thus able to set up the adaptable decoration and lighting system of the present invention once and do not need to remove the adaptable decoration and lighting system to decorate for different holidays. The adaptable decoration and lighting system of the present invention is also collapsible and replaces a variety of other holiday decorations, thereby saving space and removing clutter within people's homes.

As used in this application, the term “about” or “approximately” refers to a range of values within plus or minus 10% of the specified number. And the term “substantially” refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein. The term “midportion” means anywhere within the middle thirty percent of a length, so that outside of the "midportion" can be the distal or proximal forty to seventy percent of the length.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A decoration and lighting system comprising:

a shaft;

a plurality of support ribs pivotally coupled to the shaft at a distal end thereof so that the plurality of support ribs is simultaneously movable between a retracted condition and a plurality of extended conditions;

a locking mechanism slidably connected along the shaft in such a way as to enable the movability between the retracted condition and the plurality of extended conditions as well as lock the plurality of support ribs in each of the plurality of extended conditions; and a plurality of light strings connected to the plurality of support ribs so as to have a spaced apart concentric relationship relative to each other.

2. The decoration and lighting system of claim 1, further comprising:

a decoration accessory removably attachable to the shaft or one support rib of the plurality of support ribs.

3. The decoration and lighting system of claim 2, wherein the shaft has a shaft length, and each of the plurality of support ribs have a rib length so that in one of the plurality of extended conditions a distal end of each of the plurality of support ribs and a proximal end of the shaft share a prop elevation.

4. The decoration and lighting system of claim 3, wherein each of the plurality of light strings connects to the plurality of support ribs.

5. The decoration and lighting system of claim 4, further comprising a plurality of stretching ribs pivotally coupled to and circumferentially spaced apart along the locking mechanism so that each of the plurality of stretching ribs, at a distal end, is pivotably coupled to a midportion of an operatively associated support rib of the plurality of support ribs.

6. The decoration and lighting system of claim 5, wherein slidable movement of the locking mechanism along the shaft urges, by way of the plurality of stretching ribs, the plurality of support ribs to move between the retracted condition and the plurality of extended conditions.

7. The decoration and lighting system of claim 6, further comprising a canopy that envelops an inward surface and an outward surface of the plurality of support ribs.

8. The decoration and lighting system of claim 7, wherein the plurality of support ribs is locked in a tree configuration, supported along the prop elevation by a supporting surface, and the decorative accessory is a star connectable to the distal end of the shaft.

9. The decoration and lighting system of claim 8, wherein the device is locked in the most extend condition, with the plurality of support ribs radially extending from the distal end of the shaft and the decorative accessory is a spider connectable to one of the plurality of support ribs.

10. A method of decoratively lighting for a plurality of holidays, the method comprising:

in early October, locking the decoration and lighting system of claim 2 at a fully extended condition, wherein the decorative accessory is a spider;

in early December, moving said decoration and lighting system to a tree extended condition so that the plurality of support ribs define an approximate thirty-degree angle with the shaft;

locking said decoration and lighting system in the tree extended condition;

propping said decoration and lighting system along a substantially level supporting surface by way of a proximal end of the shaft and distal ends of the plurality of support ribs; and replacing the spider with a star decorative accessory, wherein the star decorative accessory is removably connected to the distal end of the shaft.

* * * * *